United States Patent [19]

Overbeek et al.

[11] Patent Number: 4,988,762
[45] Date of Patent: Jan. 29, 1991

[54] AQUEOUS COATING COMPOSITIONS

[75] Inventors: Gerardus C. Overbeek; Martinus P. J. Heuts, both of Holland, Netherlands

[73] Assignee: ICI Resins b.v., Waalwijk, Netherlands

[21] Appl. No.: 351,461

[22] Filed: May 15, 1989

[30] Foreign Application Priority Data

May 13, 1988 [GB] United Kingdom ................ 8811436

[51] Int. Cl.$^5$ ................................................ C08F 8/32
[52] U.S. Cl. .................................. 524/839; 525/329.9; 526/310
[58] Field of Search ............................. 524/839, 802; 525/329.9; 526/310

[56] References Cited

U.S. PATENT DOCUMENTS 3,929,743 12/1975 Sramek ............................... 524/555
4,221,885 9/1988 Schimmez et al. ................ 524/560

Primary Examiner—Joseph L. Schofer
Assistant Examiner—Jeffrey T. Smith
Attorney, Agent, or Firm—Cushman, Darby & Cushman

[57] ABSTRACT

An aqueous selfcrosslinkable coating composition which comprises an aqueous dispersion of at least one vinyl polymer, wherein the polymer system constituting said at least one vinyl polymer has chain-pendant amine functional groups and chain-pendant carbonyl functional groups to provide a selfcrosslinking reaction during and/or after coating formation from the composition. The vinyl polymers having both amine and carbonyl groups are also claimed.

20 Claims, No Drawings

AQUEOUS COATING COMPOSITIONS

This invention relates to selfcrosslinkable aqueous coating compositions containing certain vinyl polymers, and to certain vinyl polymers for use therein.

The provision of polymeric film coatings on a variety of substrates, usually for protective or adhesive purposes, is a well established field of technology. It is well known to improve the performance of such coatings by causing them to become crosslinked during and/or after film-formation from the composition. Aqueous polymer coating compositions for achieving such an objective are well known and a useful refinement has been to employ selfcrosslinkable polymer coating compositions for this purpose.

We have now discovered a new and useful class of selfcrosslinkable coating compositions for providing coatings of excellent properties which comprise certain vinyl polymers having certain functional groups dispersed therein to effect selfcrosslinking, often at ambient or low temperatures, during and/or after film-formation.

According to the present invention there is provided an aqueous selfcrosslinkable coating composition which comprises an aqueous dispersion comprising at least one vinyl polymer, wherein the polymer system constituting said at least one vinyl polymer has chain-pendant amine functional groups and chain-pendant carbonyl functional groups to provide a selfcrosslinking reaction during and/or after coating formation from the composition.

For the purposes of this invention an "aqueous dispersion" means a dispersion of the at least one vinyl polymer in an aqueous medium of which water is the principal component.

Preferably the aqueous dispersion is an aqueous latex of said at least one vinyl polymer. Minor amounts of organic liquids may optionally be present.

By an amine functional group is meant an amine group which is bonded to a carbon atom and which can take part in selfcrosslinking with a carbonyl group. Preferably the amine group is bonded to a carbon atom of an aliphatic or aromatic grouping such as an alkylene or arylene group; the amine group is particularly a primary (—NH$_2$) aliphatic or aromatic amine group. It is particularly preferred that the pendant amine groups are incorporated by being part of chain-pendant aminoalkyl carboxylate groups of formula —C(O)—O—R$_1$—NH$_2$ where R$_1$ is an alkylene group, preferably of up to 20 carbon atoms, more preferably 2 or 3 carbon atoms.

By a carbonyl functional group in this specification (unless otherwise specified) is meant the carbonyl functionality of a ketone or aldehyde group. Such groups are derived from at least one carbonyl-functional olefinically unsaturated monomer used in the preparation of the vinyl polymer(s).

There are two basic possibilities embraced by the scope of the present invention. These are as follows:
A. The composition comprises at least one vinyl polymer bearing both chain-pendant amine functional groups and chain-pendant carbonyl functional groups in the same vinyl polymer molecules. This is the preferred possibility for the present invention. The compositions of this embodiment can optionally include additional vinyl polymer(s) bearing chain-pendant amine and/or carbonyl functional groups in different polymer molecules, although this is not preferred.
B. The at least one vinyl polymer of the composition consists of two or more vinyl polymers which bear chain-pendant amine functional groups and chain-pendant carbonyl functional groups in different vinyl polymer molecules.

The selfcrosslinking reaction afforded by the compositions of the invention probably occurs via the formation of azomethine groups

from the amine and carbonyl functionalities.

It is preferred that the composition of the invention contains amine functional and carbonyl functional groups in a ratio of 1:20 to 20:1, more preferably 1:10 to 10:1.

By a "vinyl polymer" in this specification is meant any addition polymer derived from one or more olefinically unsaturated monomers, i.e. the term is intended to be used in a general sense (and is not merely directed to polymers derived from monomers having the vinyl grouping) and e.g. embraces acrylic polymers and polymers comprising a high proportion of polymerised vinylidene chloride units.

It is believed that a vinyl polymer bearing both chain-pendant amine functional groups and chain-pendant carbonyl functional groups, as employed in the preferred composition of the invention (possibility A), is novel and inventive in its own right. Accordingly, the present invention is further directed to such a polymer.

A vinyl polymer bearing both chain-pendant amine functionality and chain pendant carbonyl functionality is preferably a copolymer formed by first preparing, using a free-radical polymerisation process, a precursor Copolymer comprising polymerised units of at least one olefinically unsaturated monomer having an amine precursor group(s) (i.e. a group which may be subsequently reacted to provide a pendant amine group), at least one carbonyl- containing olefinically unsaturated monomer, and at least one other olefinically unsaturated monomer (i.e. monomer providing neither amine groups, amine precursor groups nor carbonyl functionality), and subsequently reacting at least a proportion of the amine precursor groups to provide chain-pendant amine functional groups.

The chain-pendant precursor group is particularly a carboxylic acid group —CO$_2$H (or its carboxylate salt). Accordingly, the preferred vinyl polymer comprises a free radical addition polymer comprising polymerised units of at least one olefinically unsaturated monomer providing chain-pendant carboxyl groups at least a proportion of which have been subsequently reacted to provide chain-pendant amine functional groups, at least one carbonyl-containing olefinically unsaturated monomer, and at least one other olefinically unsaturated monomer (providing neither amine groups, carboxyl groups nor carbonyl functionality).

It is particularly preferred that the chainpendant amine functionality is introduced into the vinyl polymer by an imination reaction involving the carboxyl (or carboxylate salt) groups of the precursor polymer and an added aziridine compound. The arizidine compound is commonly referred to as an alkylene imine and preferably has the formula

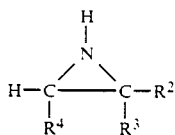

where $R^2$ and $R^3$ which may be the same or different are selected from hydrogen, benzyl, aryl, and alkyl of 1 to 5 carbon atoms; and where $R^4$ is hydrogen or alkyl of 1 to 5 carbon atoms. More preferably $R^2$ is hydrogen, $R^3$ is hydrogen or alkyl of 1 to 5 carbon atoms (particularly methyl) and $R^4$ is hydrogen. Ethylene imine ($R^2=R^3=R^4=H$) and propylene imine ($R^2=R^4=H$; $R^3=$methyl) are particularly preferred aziridines because of their relatively low cost and ready availability. The corresponding chain-pendant amino ester groups (providing chain-pendant amine functional groups) formed by the imination reaction have the formulae

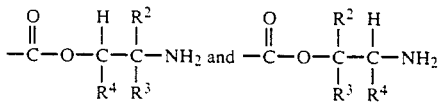

where $R^2$, $R^3$ and $R^4$ are as defined above (in the case of using ethylene imine, these two formulae will be the same).

The amount of alkylene imine used should be sufficient to iminate the desired proportion of the carboxyl groups to aminoalkyl ester groups. Preferably the amount used should be sufficient to iminate about 5% to 95%, preferably 20% to 80%, of the carboxyl groups on the precursor polymer. The imination technique is in itself well-known and may be performed by techniques known to the art.

Monomers which can be used to provide carboxyl groups in the precursor polymer are particularly $\alpha,\beta$-monoolefinicaly unsaturated monocarboxylic acids and/or dicarboxylic acids, usually of 3 to 6 carbon atoms, especially acrylic acid, methacrylic acid, beta-carboxyethylacrylate, fumaric acid and itaconic acid.

The chain-pendant amine functionality may also be introduced into the vinyl polymer by techniques other than imination.

In one such other method the amine precursor groups are oxazoline groups derived from the polymerisation of an olefinically unsaturated oxazoline monomer (i.e. an oxazoline having an unsaturated substituent in the 2-position). An example of such a monomer would be 2-isopropenyl oxazoline. Hydrolysis of oxazoline groups in the precursor polymer will yield aminoalkyl ester groups and hence provide chain-pendant amine groups.

In another such method, the amine precursor groups are ketimine groups derived from the polymerisation of a ketimine unsaturated monomer. Such monomers can e.g. be produced by first reacting a ketone or aldehyde with an aliphatic amino compound (selected from primary amines, secondary amines, and ethanolamines) to produce a ketimine, and further reacting the ketimine with an ethylenic derivative containing an ethylenically unsaturated group. A ketimine monomer can also be prepared by reacting an amino-containing olefinically unsaturated monomer with ketones or aldehydes (see U.S. Pat. No. 4,328,144). Hydrolysis of ketimine groups in the precursor polymer will generate chain-pendant amine functional groups.

In another such method, there may be employed hindered amine monomers, i.e. olefinically unsaturated monomers bearing amine groups which are in a sterically hindered environment (e.g. by being bonded to a tertiary or perhaps secondary carbon atom).

Examples of olefinically unsaturated monomers which provide chain-pendant carbonyl functionality in the vinyl polymer (and in the precursor polymer to the vinyl polymer if precursor groups are used for the provision of amine functionality as described above) include acrolein, methacrolein, diacetone acrylamide, crotonaldehyde, 4-vinylbenzaldehyde, vinyl alkyl ketones of 4 to 7 carbon atoms such as vinyl methyl ketone, and acryloxy— and methacryloxy-alkyl propranals of formula

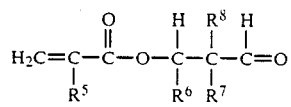

where $R^5$ is H or methyl, $R^6$ is H or alkyl of 1 to 3 carbon atoms, $R^7$ is alkyl of 1 to 3 carbon atoms, and $R^8$ is alkyl of 1 to 4 carbon atoms. Other examples include acrylamidopivalaldehyde methacrylamidopivalaldehyde, 3-acrylamidomethyl-anisaldehyde, diacetone acrylate, acetonyl acrylate, diacetone methacrylate, acetoacetoxyethyl methacrylate, 2-hydroxypropylacrylateacetylacetate, and butanediolacrylate acetylacetate.

The carbonyl-containing monomer(s) is preferably selected from acrolein, diacetone acrylamide, acetoacetoxyethyl methacrylate and methyl vinyl ketone.

The at least one vinyl polymer will normally also comprise a high proportion of polymerised units derived from one or more olefinically unsaturated monomers which provide neither amine functional groups, amine precursor groups, nor carbonyl groups. Examples of such monomers which may be mentioned include 1,3-butadiene, isoprene, styrene, divinyl benzene, acrylonitrile, methacrylonitrile, vinyl halides such as vinylidene chloride (in particular) and vinyl chloride, vinyl esters such as vinyl acetate, vinyl propionate and vinyl laurate), heterocyclic vinyl compounds, alkyl esters of monolefinically unsaturated dicarboxylic acids (such as di-n-butyl maleate and di-n-butyl fumarate) and, in particular, esters of acrylic acid and methacrylic acid of formula $$CH_2=CR^9COOR^{10}$$

where $R^9$ is H or methyl and $R^{10}$ is alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate and n-propyl methacrylate.

Particularly preferred vinyl polymers according to the invention comprise at least the following polymerised units:
(a) units having pendant amine functional groups which are present in groups of formula —C-(O)—O—CH$_2$CH$_2$NH$_2$, or —C-(O)—O—CH$_2$CH(CH$_3$)NH$_2$ and —C-

(O)—O—CH(CH$_3$)CH$_2$NH$_2$, derived from precursor carboxyl groups in a corresponding precursor polymer by imination thereof with ethylene imine or propylene imine respectively;
(b) units derived from at least one carbonyl-containing monomer selected from acrolein, diacetone acrylamide, acetoacetoxyethyl methacrylate, and methyl vinyl ketone; and
(c) units derived from at least one olefinically unsaturated monomer other than one for providing chain-pendant amine and carbonyl groups, and particularly at least one monomer selected from those of formula CH$_2$=CR$^9$COOR$^{10}$ (as defined above) and vinylidene chloride.

The polymerised units of a precursor polymer having precursor carboxyl groups for conversion into units (a) (by imination) is preferably derived from at least one of acrylic acid, methacrylic acid, beta-carboxyethylacrylate, fumaric acid, and itaconic acid.

Vinyl polymers having chain-pendant amine groups but not chain-pendant carbonyl groups, or having chain-pendant carbonyl groups but not chain-pendant amine groups (as might be used in possibility B) are known to the art and may be prepared as such. For example, a vinyl polymer having chain-pendant amine functionality (but not chain-pendant carbonyl funtionality) could be prepared as already described above for preparing the novel vinyl monomers of the invention with the ommission of the use of any carbonyl-containing monomer (although the amine functionality could of course be achieved more simply by the direct polymerisation of an amine-containing olefinically unsaturated monomer such as an aminoalkyl ester of an olefinically unsaturated carboxylic acid). Similarly a vinyl polymer having chain-pendant carbonyl functionality (but not chain-pendant amine functionality) could be prepared as already described above for preparing the novel vinyl polymers of the invention with either the ommission of the use of any monomer which can provide (directly, or indirectly by means of a precursor group) chain-pendant amine functionality, or if such a monomer (of the precursor type) is in fact used, not performing any subsequent conversion to an amino function.

A vinyl polymer (or a precursor polymer thereof) for use in the composition of the present invention (whether of the novel type used in possibility A or of the known type used in possibility B) may be prepared by any suitable free-radical initiated polymerisation technique, a free-radical initiator and (usually) appropriate heating being employed. The polymerisation is normally effected in an aqueous medium, and in particular aqueous emulsion polymerisation is used to prepare the polymer with conventional dispersants being used (e.g. anionic and/or non-ionic emulsifiers such as Na salts of dialkylsulphosuccinates, Na salts of sulphated oils, Na salts of alkyl sulphonic acids, Na, K and ammonium alkyl sulphates, C$_{22-24}$ fatty alcohols, ethoxylated fatty acids and/or fatty amides, and Na salts of fatty acids such as Na stearate and Na oleate; the amount used is usually 0.1 to 3% by weight on the weight of total monomer(s) charged and conventional free radical initiators being used (e.g. hydrogen peroxide, persulphates such as ammonium persulphate, K persulphate and Na persulphate: redox systems may be used: the amount is generally 0.05 to 3% based on the weight of total monomers charged).

In one advantageous embodiment of the invention, a sequential polymerisation process is adopted whereby monomers of the core region (i.e. fed early) will provide a "soft" polymeric phase (e.g. glass transition temperature Tg≦20° C., more preferably −45 to 15° C.) while monomers for the shell region (i.e. late fed) will provide a "hard" polymeric phase (e.g. Tg≧50° C., more preferably 60 to 95° C.). The partition of monomers between the first (early) and second (late) monomer feed can vary between wide limits. The early fed monomers are preferably used in an amount of 45 to 95% by weight based on total monomer feed, more preferably 60 to 90% by weight. The late fed monomers are preferably used in an amount of 5 to 55% by weight based on total monomer feed, more preferably 10 to 40% by weight.

Examples of "soft" core monomers include 2-ethylhexyl acrylate, 2-ethylhexyl methacrylate, n-butylacrylate, n-butyl methacrylate, n-octylacrylate, n-decyl acrylate, n-lauryl acrylate, n-lauryl methacrylate, ethyl acrylate; and examples of "hard TM shell monomers include methyl methacrylate, isobutyl methacrylate, styrene, ethyl methacrylate, n-butyl methacrylate, and acrylonitrile. It should be appreciated that monomers which if they were polymerised alone would provide homopolymers of high Tg (e.g. ≧50° C.) may optionally be used in the "soft" phase, and monomers providing homopolymers of low Tg (e.g. <10° C.) may optionally be used in the "hard" phase, so long as the Tg's of both phases remain essentially soft and hard as discussed above and preferably within the above mentioned limits.

The said at least one vinyl polymer for use in the composition of the invention preferably has a weight average molecular weight within the range 5000 to 6,000,000 (more preferably 30,000 to 2,000,000).

The polymer system constituting said at least one vinyl polymer and having chain-pendant amine and carbonyl groups preferably contains a proportion of amine groups within the range 5 to 120 millimoles per 100 g of (solid) polymer (more preferably 10 to 100 millimoles per 100 g of solid polymer) and a proportion of carbonyl groups within the range 5 to 120 millimoles per 100 g of solid polymer (more preferably 10 to 100 millimoles per 100g of solid polymers). As described already, such groups may be present on different vinyl polymer chains or (more preferably) on the same vinyl polymer chain.

In the preferred vinyl polymers, which have both chain-pendant amine groups and chain-pendant carbonyl groups (being novel and claimed herein), the proportion of polymerised units bearing pendant amine groups is preferably in the range 1 to 20 mole % (more preferably 2 to 14 mole %), the proportion of polymerised units bearing pendant carbonyl groups is preferably in the range 1 to 20 mole % (more preferably 2 to 14 mole %). and the proportion of polymerised units bearing neither pendant amine nor pendant carbonyl groups is preferably in the range 60 to 90 mole % (more preferably 72 to 96 mole %).

In a further embodiment of the invention, the aqueous coating composition includes at least one polyhydrazine (or polyhydrazone) compound, i.e. a compound having 2 or more hydrazine (or hydrazone) groups. This may further enhance the selfcrosslinking capacity of the composition and hence may further improve the properties of the resulting crosslinked coating.

Where the composition of the invention does incorporate a polyhydrazine (or polyhydrazone) compound, the level of such polyhydrazine (or polyhydrazone) compounds(s) is preferably that to provide a range 0.02 to 1.8 moles hydrazine (or hydrazone) groups per mole of carbonyl groups present in the vinyl polymer(s), more preferably 0.1 to 1.0 moles. Examples of such suitable polyhydrazine (or polyhydrazone) compounds include dicarboxylic acid bishydrazides of formula

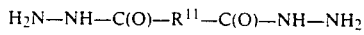
$$H_2N-NH-C(O)-R^{11}-C(O)-NH-NH_2$$

and dicarboxylic acid bis-hydrazones of formula.

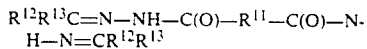
$$R^{12}R^{13}C=N-NH-C(O)-R^{11}-C(O)-N-H-N=CR^{12}R^{13}$$

wherein $R^{11}$ is a covalent bond or a polyalkylene (preferably polymethylene) or alicyclic group having from 1 to 34 carbon atoms or a divalent aromatic ring, and $R^{12}$ and $R^{13}$ are selected from the group consisting of H and ($C_1$ to $C_6$) alkyl and alicyclic groups. Examples of suitable dihydrazides includes oxalic acid dihydrazide, malonic acid dihydrazide, succinic acid dihydrazide, glutaric acid dihydrazide, adipic acid dihydrazide, cyclohexane dicarboxylic acid bis-hydrazide, azelaic acid bis-hydrazide, and sebacic acid dihydrazide. Other suitable compounds are polyhydrazides of carbonic acid, e.g. carbonic acid dihydrazide and compounds of the general formula

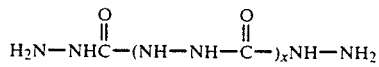
$$H_2N-NHC\overset{O}{\overset{\|}{-}}(NH-NH-\overset{O}{\overset{\|}{C}}-)_xNH-NH_2$$

where x is from 1 to 5, preferably from 1 to 3, and bis-semicarbazides, especially aliphatic and cycloaliphatic bis-semicarbazides of the general formula:

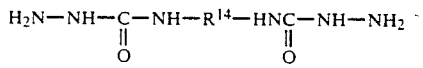
$$H_2N-NH-\underset{O}{\overset{\|}{C}}-NH-R^{14}-HN\underset{O}{\overset{\|}{C}}-NH-NH_2$$

where $-R^{14}-$ is a straight or branched aliphatic radical of 2 to 7 carbon atoms or a carbocyclic radical of 6 to 10 Carbon atoms, eg. o-, m- or p-phenylene or toluylene or cyclohexylidene or methylcyclohexylidene. Polyhydrazides of aromatic polycarboxylic acids, e.g. the dihydrazides of phthalic acid, terephthalic acid and isophthalic acid, and the dihydrazides, the trihydrazide and the tetrahydrazide of pyromellitic acid, are other examples. Examples of other suitable compounds are polyhydrazides of polyacrylic acids which contain 2 or more hydrazide groups, in most cases from 20 to 100 hydrazide groups, per molecule, trihydrazides, e.g. nitrilotriacetic acid trihydrazide, and tetrahydrazides, e.g. ethylenediaminetetraacetic acid tetrahydrazide. Further possible hydrazides are dihydrazino- and trihydrazino-triazine, thiocarbohydrazide and N,N'-diaminoguanidine, as well as hydrazinopyridine derivatives of the type of 2-hydrazino-pyridine-5-carboxylic acid hydrazide,3-chloro-2-hydrazino pyridine-5-carboxylic acid hydrazide, 6-chloro-2- hydrazinopyridine-4-carboxylic acid hydrazide and 2,5-dihydrazinopYridine-4-carboxylic acid, and bis-thiosemicarbazides as well as bis-hydrazines of alkylene-bis-acrylamides, dihydrazinoalkanes and dihydrazines of aromatic hydrocarbons, e.g. 1,4-dihydrazinobenzene, 1,3-dihydrazinobenzene and 2,3-dihydrazinonaphthalene.

The compositions of the invention, if containing polyhydrazine (or polyhydrazone) compound(s) optionally contain 0.0002 to 0.02 mole per mole of hydrazine (or hydrazone) groups of a heavy metal ion. This may be added in the form of suitable water-soluble metal salts, particularly chlorides, sulphates, and acetates. Suitable heavy metal water-soluble salts are, in particular, those of Cu, Zn, Fe, Cr, Mn, Pb, V, Co and Ni.

The aqueous composition of the invention if desired may include at least one other polymer (i.e. a polymer other than a functionalised vinyl polymer of the type(s) described above). This is usually a free radical addition polymer, formed by the free radical addition polymerisation of at least one olefinically unsaturated monomer. The different polymers may be present in the composition in simple admixture but can also be present in such a way that there is at least a proportion of chemical bonding between the polymers to form (in effect) at least a proportion of grafting between the polymers.

The incorporation of the further polymer into the composition of the invention may be effected in various ways, the simplest method being to simply admix preformed dispersions of the two types of polymer.

Another method is to conduct the polymerisation to form the further polymer in the presence of an aqueous-based dispersion of the at least one vinyl polymer (and obviously in such a process some grafting to the vinyl polymer may also occur).

Monomers which may be polymerised to form the optional further polymer component in embodiments or variants of the types discussed above include any free radical-polymerisable olefinically unsaturated compounds or mixtures thereof. Thus, there may be mentioned hydrocarbon monomers, for example 1,3-butadiene, isoprene, styrene and divinylbenzene, acrylic and substituted acrylic monomers, for examples acrylic and methacrylic acids, acrylonitrile, methyl, ethyl, n-butyl, isobutyl and 2-ethylhexyl acrylates and methacrylates, acrylamide, methacrylamide, N-methylolacrylamide, allyl and methallyl acrylates and methacrylates, and other commonly used monomers such as vinyl esters, vinyl ethers, and heterocyclic vinyl compounds.

The aqueous compositions of the invention may be advantageously employed as coating compositions, e.g. protective coating compositions) or adhesive coating compositions (particularly in pressure sensitive adhesive systems). For such purposes they may be used "as is" or further diluted with water and/or organic solvents, or they may be supplied in more concentrated form by evaporation of water and/or organic components of the liquid medium. As coating compositions, they may be applied to a variety of substrates including wood, metals, glass, cloth, leather, paper, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, tillers, sedimentation inhibitors, fire retardants, UV absorbers, antioxidants and the like introduced at any convenient stage of the production process or subsequently.

In many cases the compositions are useful in applications where treatment is effected at ambient or low temperatures. In other cases they may advantageously be employed in stoving applications (using higher temperatures, e.g. where the coating is subjected to temperatures within the range of from 80 to 160° C.).

The compositions, which are in the form of aqueous dispersions, suitably have solids contents of from about 20 to 60% by weight, preferably from about 30 to 50% by weight.

The present invention is now illustrated by the following examples. Unless otherwise specified, all parts and percentages are on a weight basis. The prefix C before an example number denotes that it is comparative.

EXAMPLE 1

This example describes the preparation of an aqueous-based selfcrosslinkable coating composition according to the invention containing an aqueous latex of an acrylic copolymer having pendant carbonyl-groups and having pendant amine groups. The preparation of this polymer latex was as follows.

A precursor polymer having pendant carbonyl and pendant carboxyl groups was first made using the following procedure.

To a three necked flask provided with an agitator, reflux condensor, dropping funnel and nitrogen inlet tube, was added:554.91 parts of water and 22.20 parts of a 30% emulsifier (Akyposal 9278 R) solution. To this vessel, 10% of the emulsified first-feed composition described below was added. In a nitrogen atmosphere the temperature of the vessel contents was brought to 85° C. (while stirring). When this temperature had been reached the remaining part of the first-feed was added in 80 minutes at the same temperature. When the first feed had been added, the second feed composition described below was added (emulsified) to the reactor in 40 minutes. When the second feed had been completed the temperature was kept at 85° C. for another hour before cooling to room temperature.

| Composition first feed: | parts |
| --- | --- |
| water | 200.00 |
| emulsifier (30%) | 36.26 |
| potassium persulphate | 2.23 |
| n-butyl acrylate | 271.95 |
| n-butyl methacrylate | 181.30 |
| methacrylic acid | 31.08 |
| acrolein | 33.67 |

| Composition Second Feed: | parts |
| --- | --- |
| water | 123.00 |
| emulsifier (30%) | 15.54 |
| potassium persulphate | 0.96 |
| n-butyl methacrylate | 62.16 |
| methyl methacrylate | 135.42 |
| methacrylic acid | 13.32 |
| diacetone acrylamide | 11.10 |

The precursor polymer latex was treated with ammonia (12.5%) to adjust the pH of the medium to 6.5. After this the emulsion was heated to 33° C. Within 45 minutes. 21.64 parts of propylene imine was added. When the propylene imine had been added completely, the temperature was brought to 45° C. and maintained for 30 minutes before cooling to room temperature. In this way, pendant amine groups were formed from pendant carboxyl groups via imination.

Films made on glass plates from the iminated polymer emulsion, showed a methyl ethyl ketone (MEK) double rub resistance of at least 200 double rubs, when the films were aged one night at room temperature. When the films were made from the emulsion before iminisation, only 18 MEK double-rubs could be achieved before the polymer was dissolved completely. (The double rub test assesses the solvent resistance of a film and is effected by rubbing the film to and fro with a rag soaked with the solvent until the substrate is showing through, the result being quoted as the number of double rubs to effect this).

EXAMPLE 2

This example describes the preparation of an aqueous-based selfcrosslinkable coating composition according to the invention containing an aqueous latex of an acrylic copolymer having pendant carbonyl-groups and having pendant amine groups. The preparation of this polymer latex was as follows.

A precursor polymer having pendant carbonyl and pendant carboxyl groups was first made using the following procedure. To a three necked flask provided with an agitator, reflux condensor, dropping funnel and nitrogen inlet tube, was added:643.66 parts of water and 70.25 parts of a 20% emulsifier (Surfagene FAZ-l09V) solution. To this vessel, 10% of the emulsified feed composition described below was added. In a nitrogen atmosphere, the temperature of the vessel contents was brought to 90° C. (while stirring). When this temperature had been reached the remaining part of the feed was added in 60 minutes at the same temperature. After this, the reactor was kept at 90° C. for another hour before cooling to room temperature.

| Composition feed: | parts |
| --- | --- |
| water | 496.46 |
| emulsifier (20%) | 35.07 |
| NaHCO$_3$ | 0.96 |
| ammonium persulphate | 2.41 |
| styrene | 151.29 |
| n-butyl methacrylate | 435.62 |
| butyl acrylate | 80.40 |
| methacrylic acid | 28.14 |
| acrylic acid | 28.14 |
| acetoacetoxyethylmethacrylate | 80.40 |

The precursor polymer latex was treated with ammonia (12.5%) to adjust the pH of the medium to 7.0. After this, the emulsion was heated to 33° C. and 20.49 parts of propylene imine were added over 45 minutes. When the propylene imine had been added, the temperature was kept at 35° C. for another hour before cooling to room temperature. In this way, pendant amine groups were formed from pendant carboxyl groups via imination.

Films made on glass plates from the iminated emulsion showed a MEK- and ethanol double-rub resistance of at least 200 double rubs when the films were aged one night at room temperature. When the films were made from the emulsion before iminisation, only 14 MEK double-rubs and 58 ethanol rouble rubs could be achieved before the polymer was dissolved completely.

EXAMPLE C3

This example describes the preparation of a comparative aqueous-based selfcrosslinkable coating composition containing an aqueous latex of an acrylic copolymer having pendant carbonyl groups but no pendant amine groups, and also a polyhydrazide compound. The polymer latex was prepared as follows.

To a three necked flask provided with an agitator, reflux condensor, dropping funnel and nitrogen inlet tube, was added: 520.00 parts of water, 1.33 parts of sodium hydrogen carbonate and 32.50 parts of a 30% sodium lauryl ether sulphate emulsifier (Akyposal 9278 R) solution. To this vessel, 10% of the emulsified monomer feed composition described below was added. In a nitrogen atmosphere, the temperature of the vessel contents was brought to 85° C. (while stirring). When this temperature had been reached the remaining part of the emulsified monomer feed was added in 120 minutes, at the same temperature. The diacetone acrylamide (DAAM) solution described below was simultaneously added with the emulsified monomer feed, but at a rate of 80% during the first 80 minutes end 20% during the last 40 minutes. After completing the monomer feeds and maintaining the temperature at 85° C. for 15 minutes, a postreaction was started by adding a solution of 15.00 parts of water and 0.70 parts of potassium persulphate. After maintaining the temperature at 85° C. for 0.5 hour the polymer latex was cooled to room temperature.

| Compostion monomer feed: | parts |
|---|---|
| water | 269.30 |
| sodium hydrogen carbonate | 1.33 |
| sodium lauryl ether sulphate (Akyposal 9278R, 30%) | 48.84 |
| potassium persulphate | 3.18 |
| n-butyl acrylate | 334.33 |
| methyl methacrylate | 324.27 |
| methacrylic acid | 44.40 |
| Composition DAAM solution | parts |
| water | 109.50 |
| diacetone acrylamide | 36.50 |

The polymer latex was neutralized with 51.37 parts of ammonia (12.5%) to pH 8.6. The polymer had pendant carbonyl groups but no pendant amine groups. To this emulsion was added 217.27 parts of a 7.5% adipic acid dihydrazide solution (pH 8-8.5) and 31.95 parts of a 0.08% zinc sulphate solution, followed by mixing the latex for 30 minutes.

EXAMPLE 4

This example describes an aqueous-based selfcrosslinkable coating composition according to the invention containing an aqueous latex of an acrylic copolymer having pendant carbonyl and pendant amine groups.

To 1713.23 parts of a polymer as described in Example C3 before neutralization were added 6.06 parts of ammonia (12.5%) for neutralization to pH 6.5. The emulsion was heated to 30° C. and 20.62 parts of propylene imine were added during 40 minutes while maintaining a temperature of 30-35° C. When the propylene imine had been added completely, the temperature was kept at 30-35° C. for 60 minutes. In this way, pendant amine groups were formed from pendant carboxyl groups via imination.

EXAMPLE 5

This example describes an aqueous-based selfcrosslinkable coating composition according to the invention containing an aqueous latex of an acrylic copolymer having pendant carbonyl and pendant amine groups, and also a polyhydrazide compound.

To 1713.23 parts of a polymer as described in Example C3 (before neutralization) were added 6.06 parts of ammonia (12.5%) for neutralization to pH 6.5. The emulsion was heated to 30° C. and 20.62 parts of propylene imine were added during 40 minutes while maintaining a temperature of 30-35° C. When the propylene imine had been added completely, the temperature was kept at 30-35° C. for 60 minutes. In this way, pendant amine groups were formed from pendant carboxyl groups via imination.

To this latex was added 76.43 parts of a 7.5% adipic acid dihydrazide solution (pH 8-8.5) and 10.68 parts of a 0.08% zinc sulphate solution. The latex was stirred for 30 minutes.

The properties of the films made from the compositions of Examples C3, 4 and 5 are shown in the following Table.

|  | Example C3 | Example 4 | Example 5 |
|---|---|---|---|
| Ethanol double rubs (no.) | 145 | >200 | >200 |
| MEK double rubs (no.) | 87 | 76 | >200 |

EXAMPLE 6

This example describes the preparation of an aqueous-based selfcrosslinkable coating composition according to the invention containing an aqueous latex of an acrylic copolymer having pendant carbonyl and pendant amine groups. The preparation of this polymer latex was as follows.

A precursor polymer having pendant carbonyl and pendant carboxyl groups was first made using the following procedure. To a three necked flask provided with an agitator, reflux condenser, dropping funnel and nitrogen inlet tube, was added: B66.48 parts of water. 3.85 parts of sodium hydrogen carbonate, 2.60 parts of potassium persulphate and 56.81 parts of a sodium lauryl sulphate (Akyposal SLS) solution (30%). To this vessel, 10% of the first-feed Composition as described below was added. In a nitrogen atmosphere, the temperature of the vessel contents was brought to 90° C. (while stirring). When this temperature had been reached, the remaining part of the first-feed was added in 50 minutes at the same temperature. When the first feed had been added, the second feed composition as described below was added to the reactor in 20 minutes. After completing the second monomer feed and maintaining the temperature at 85° C. for 15 minutes, a postreaction was started by adding a solution of 30.00 parts of water, 1.00 part of SLS emulsifier (30%) and 0.70 parts of potassium persulphate. After maintaining the temperature at 90° C. for 45 minutes the polymer latex was cooled to room temperature.

| Composition first feed: | parts |
|---|---|
| n-butyl acrylate | 319.75 |
| methyl methacrylate | 144.97 |
| methacrylic acid | 31.08 |
| acrolein | 22.20 |
| Composition second feed: | parts |
| methyl methacrylate | 190.34 |
| n-butyl acrylate | 18.34 |
| methacrylic acid | 13.32 |

The precursor polymer latex was treated with ammonia (12.5%) to adjust the pH of the medium to 6.5. After this the emulsion was heated to 35° C. During 40 minutes, a solution of 20.60 parts of propylene imine and 20.60 parts of water was added. When the propylene imine had been added completely, the temperature was brought to 40° C. and maintained for 1 hour before cooling to room temperature. In this way, pendant amine groups were formed from pendant carboxyl groups via imination.

Films made on glass plates from the iminated polymer emulsion showed a MEK double rub resistance of at least 200 double rubs when the films were aged one night at 50° C. When the films were made from the emulsion before iminisation, only 97 MEK double rubs could be achieved.

EXAMPLE 7

This example describes the preparation of an aqueous-based selfcrosslinkable coating composition according to the invention containing an aqueous latex of an acrylic copolymer having pendant carbonyl and pendant amine groups. The preparation of this polymer latex was as follows.

A precursor polymer having pendant carbonyl and pendant carboxyl groups was first made using the following procedure. To a three necked flask provided with an agitator, reflux condensor, dropping funnel and nitrogen inlet tube, was added: 620.47 parts of water, 1.85 parts of sodium hydrogen carbonates. 1.54 parts of potassium persulphate and 66.88 parts of an emulsifier (Surfagene FAZ-109) solution (20%). To this vessel, 10% of the emulsified monomer feed composition described below was added. In a nitrogen atmosphere the temperature of the vessel contents was brought to 90° C. (while stirring). When this temperature had been reached the remaining part of the monomer feed composition described below was added in 60 minutes at the same temperature. When the monomer feed had been completed the temperature was kept at 90° C. for another hour. Residual free monomer content was decreased by a postreaction through the addition of 0.96 parts of tert butylhydroperoxide and feeding a solution of 2.31 parts of i-ascorbic acid and 23.10 parts of water in 30 minutes at 80-82° C. After maintaining this temperature for another 30 minutes the polymer latex was cooled to room temperature.

| Composition feed: | parts |
| --- | --- |
| water | 401.32 |
| sodium hydrogen carbonate | 0.93 |
| Surfagene FAZ-109 emulsifier (20%) | 33.39 |
| potassium persulphate | 2.31 |
| 2-ethyl hexylacrylate | 220.33 |
| n-butyl methacrylate | 72.71 |
| styrene | 385.66 |
| acrylic acid | 30.85 |
| methacrylic acid | 30.85 |
| methyl vinyl ketone | 30.85 |

The precursor polymer latex was treated with 32.84 parts of ammonia (12.5%) to adjust the pH of the medium to 6.3. After this the emulsion was heated to 30° C. Within 30 minutes, a solution of 28.30 parts propylene imine and 24.64 parts of water was added. When the propylene imine had been added completely, the temperature was brought to 45° C. and maintained for 30 minutes before cooling to room temperature. In this way, pendant amine groups were formed from pendant carboxyl groups via imination.

Films made on glass plates from the iminated polymer emulsion showed a MEK double rub resistance of at least 200 double rubs when the films were aged one night at 50° C. When the films were made from the emulsion before iminisation, only 20 MEK double rubs could be achieved.

EXAMPLE 8

This example describes the preparation of an aqueous-based selfcrosslinkable coating composition according to the invention containing an aqueous latex of a vinylidene chloride/acrylic copolymer having pendant carbonyl groups and having pendant amine groups. The preparation of this polymer latex was as follows:

A precursor polymer having pendant carbonyl groups and pendant carboxy groups was first made using the following procedure. To a reactor provided with an agitator, reflux condensor, dropping funnel and nitrogen inlet tube, was added: 442.47 parts of water, 40.13 parts of a 25% sodium lauryl sulphate solution and 1.75 parts of sodium metabisulphite. To the reactor 10% of the monomer feed described below was added and 5% of the initiator feed described below. In a nitrogen atmosphere the temperature of the reactor contents was brought to 40° C. (while stirring). When this temperature had been reached and maintained for 10 minutes, the remaining part of the monomer-feed was added in 4 hours at the same temperature. The initiator feed was fed in over a period of 4 hours and 20 minutes. After this the reactor was kept at 40° C. for another hour before cooling to room temperature.

| Composition monomer feed: | parts |
| --- | --- |
| vinylidene chloride | 261.60 |
| n-butyl acrylate | 139.52 |
| methyl vinyl ketone | 13.08 |
| methacrylic acid | 21.80 |

| Composition initiator feed: | parts |
| --- | --- |
| water | 77.46 |
| potassium persulphate | 2.19 |

200 parts of the prepared precursor polymer latex were heated to 30° C. During 45 minutes, 0.90 parts of propylene imine were added. When the propylene imine had been added completely the latex was kept at 30° C. for another hour before adding 8.00 parts of a 25% solution of a nonionic surfactant ('Synperonic' NP30). After this the latex was cooled to room temperature. In this way, pendant amine groups were formed from pendant carboxyl groups via imination.

To 100 parts of the iminated latex, 2.03 parts of adipic acid dihydrazide were added. After this, the emulsion was kept at 50° C. for 30 minutes and subsequently cooled to room temperature.

Films on glass plates made from the iminated latex and with the added adipic acid dihydrazide showed an MEK double rub resistance of at least 200 double rubs when the films were aged 5 days at room temperature. When films were cast (under the same conditions) from the latex before adding the adipic acid dihydrazide 50 MEK double rubs could be achieved. When films from the latex were cast (under the same conditions) before imination, only 8 MEK double rubs could be achieved before complete dissolution of the film.

EXAMPLE 9

This example describes the preparation of an aqueous-based selfcrosslinkable coating composition according to the invention containing an aqueous latex of a vinylidene chloride/acrylic copolymer having pendant carbonyl groups and having pendant amine groups. The preparation of this polymer latex was as follows:

A precursor polymer having pendant carbonyl groups and pendant carboxyl groups was first made using the following procedure. To a reactor provided with an agitator, reflux condensor, dropping funnel and nitrogen inlet tube, was added: 442.47 parts of water, 40.13 parts of a 25% sodium lauryl sulphate solution and 1.75 parts of sodium metabisulphite. To the reactor 10% of the monomer feed described below was added and 5% of the initiator feed described below. In a nitrogen atmosphere the temperature of the reactor contents was brought to 40° C. (while stirring). When this temperature had been reached and maintained for 10 minutes, the remaining part of the monomer feed was fed in over a period of 4 hours at the same temperature. The initiator feed was fed in over a period of 4 hours and 20 minutes. After this the reactor was kept at 40° C. for another hour before cooling to room temperature.

| Composition monomer feed: | parts |
| --- | --- |
| vinylidene chloride | 261.60 |
| n-butyl acrylate | 117.72 |
| acetoacetoxyethyl methacrylate | 34.88 |
| methacrylic acid | 21.80 |
| Composition initiator feed: | parts |
| water | 77.46 |
| potassium persulphate | 2.19 |

200 parts of the prepared precursor polymer latex were heated to 30° C. During 45 minutes, 0.90 parts of propylene imine were added. When the propylene imine had been added completely the latex was kept at 30° C. for another hour before adding 8.0 parts of a 25% solution of a nonionic surfactant (Synperonic NP30). After this the latex was cooled to room temperature. In this way, pendant amine groups were formed from pendant carboxyl groups via imination.

To 100 parts of the iminated latex, 0.83 parts of adipic acid dihydrazide was added. After this, the emulsion was kept at 50° C. for 30 minutes and subsequently cooled to room temperature.

Films on glass plates made from the iminated latex and with the added adipic acid dihydrazide showed an MEK double rub resistance of 150 double rubs when the films were aged 7 days at room temperature. When films were cast (under the same conditions) from the latex before adding the adipic acid dihydrazide 81 MEK double rubs could be achieved. When films from the latex were cast (under the same conditions) before imination, only 8 MEK double rubs could be achieved before complete dissolution of the film.

We claim:

1. An aqueous selfcrosslinkable coating composition which comprises an aqueous dispersion comprising at least one vinyl polymer, wherein the polymer system constituting said at least one vinyl polymer has chain-pendant amine functional groups and chain-pendant ketone or aldehyde carbonyl functional groups to provide a selfcrosslinking reaction during and/or after coating formation from the composition.

2. A composition according to claim 1 wherein the amine functional groups in a vinyl polymer of the composition comprise primary amine groups bonded to carbon atoms of aliphatic or aromatic groups.

3. A composition according to claim 2 wherein the pendant primary amine groups in a vinyl polymer of the composition are incorporated by being part of chain-pendant aminoalkyl carboxylate groups of formula —C(O)—O—R$_1$—NH$_2$ where R$_1$ is an alkylene group.

4. A composition according to claim 1 wherein the carbonyl functional groups in a vinyl polymer of the composition are derived from at least one carbonyl-functional olefinically unsaturated monomer used in the preparation of the vinyl polymer.

5. A composition according to claim 1 wherein the ratio of amine functional groups to carbonyl functional groups is within the range of from 1:20 to 20:1.

6. A composition according to claim 1 which comprises at least one vinyl polymer bearing both chain-pendant amine functional groups and chain pendant carbonyl functional groups in the same polymer molecules.

7. A composition according to claim 1 wherein said at least one vinyl polymer consists of two or more vinyl polymers which bear chain-pendant amine functional groups and carbonyl functional groups in different polymer molecules.

8. A composition according to claim 6 wherein said vinyl polymer thereof bearing both chain-pendant amine and carbonyl functional groups in the same polymer molecules is prepared by forming, using a free-radical polymerisation process, a precursor polymer comprising polymerised units of at least one olefinically unsaturated monomer having an amine precursor group, at least one carbonyl-functional olefinically unsaturated monomer, and at least one other olefinically unsaturated monomer providing neither amine groups, amine precursor groups nor carbonyl functional groups, and subsequently reacting at least a proportion of the amine precursor groups to provide chain-pendant amine functional groups.

9. A composition according to claim 8 wherein said vinyl polymer thereof bearing both chain-pendant amine and carbonyl functional groups comprises a free-radical addition polymer comprising polymerised units of at least one olefinically unsaturated monomer providing chain-pendant carboxyl groups at least a proportion of which have been subsequently reacted to provide chain-pendant amine functional groups, at least one carbonyl-functional olefinically unsaturated monomer, and at least one other olefinically unsaturated monomer providing neither amine groups, carboxyl groups nor carbonyl functionality 10. A composition according to claim 9 wherein the amine-functional groups in said vinyl polymer are formed by an imination reaction involving the pendant carboxyl or carboxylate salt groups of the precursor polymer using an alkylene imine of formula

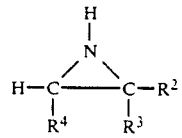

thereby to form chain-pendant amino ester groups, where R$^2$ and R$^3$ which may be the same or different are selected from hydrogen, benzyl, aryl, and alkyl of 1 to 5 carbon atoms; and where R$^4$ is hydrogen or alkyl of 1 to 5 carbon atoms.

11. A composition according to claim 10 wherein the alkylene imine employed is ethylene imine ($R^2=R^3=R^3=$hydrogen) or propylene imine ($R^2=R^4=$hydrogen; $R^3=$methyl).

12. A composition according to claim 8 wherein said at least one carbonyl-functional olefinically unsaturated monomer which is used in the preparation of the vinyl polymer is selected from one or more of acrolein, diacetone acrylamide, acetoacetoxyethyl methacrylate and methyl vinyl ketone.

13. A composition according to claim 8 wherein said at least one other olefinically unsaturated monomer used in the preparation of the vinyl polymer which provides neither amine groups, amine precursor groups nor carbonyl-functional groups is selected from one or more of esters of acrylic acid and methacrylic acid of formula $CH_2=CR^9C(O)OR^{10}$ where $R^9$ is hydrogen or methyl and $R^{10}$ is alkyl or cycloalkyl of 1 to 20 carbon atoms, and vinylidene chloride.

14. A composition according to claim 8 wherein said vinyl polymer therein comprises at least the following polymerised units:
   (a) units having pendant amine functional groups which are present in groups of formula $-C(O)-O-CH_2CH_2-NH_2$, or $-C(O)-O-CH_2CH(CH_3)NH_2$ and $-C(O)-O-CH(CH_3)CH_2NH_2$, derived from precursor carboxyl groups in a corresponding precursor polymer by imination thereof with ethylene imine or propylene imine respectively;
   (b) units derived from at least one carbonyl-containing monomer selected from acrolein, diacetone acrylamide, acetoacetoxyethyl methacrylate and methyl vinyl ketone; and
   (c) units derived from at least one olefinically unsaturated monomer selected from those of formula $CH_2=CR^9C(O)OR^{10}$, and vinylidene chloride.

15. A composition according to claim 8 wherein said vinyl polymer thereof bearing both chain-pendant amine and carbonyl functional groups comprises 1 to 20 mole % of polymerised units bearing pendant amine groups, 1 to 20 mole % of polymerised units bearing pendant carbonyl groups and 60 to 90 mole % of polymerised units bearing neither pendant amine nor pendant carbonyl groups.

16. A composition according to claim 1 wherein said at least one vinyl polymer has a core/shell structure, the core providing a soft polymeric phase of $Tg \leq 20°$ C. and the shell providing a hard polymeric phase of $Tg \geq 50°$ C.

17. A composition according to claim 1 wherein the polymer system contains a proportion of amine groups within the range 5 to 120 millimoles per 100 g of polymer solids and a proportion of carbonyl groups within the range 5 to 120 millimoles per 100 g of polymer solids.

18. A composition according to claim 1 wherein said composition also includes at least one polyhydrazine or polyhydrazone compound.

19. A process for applying a protective or adhesive coating to a substrate which comprises utilizing a composition according to claim 1 for such coating.

20. A process according to claim 19 wherein the coating is subjected to a temperature within the range of from 80° C. to 160° C.

* * * * *